United States Patent Office 3,006,059
Patented Oct. 31, 1961

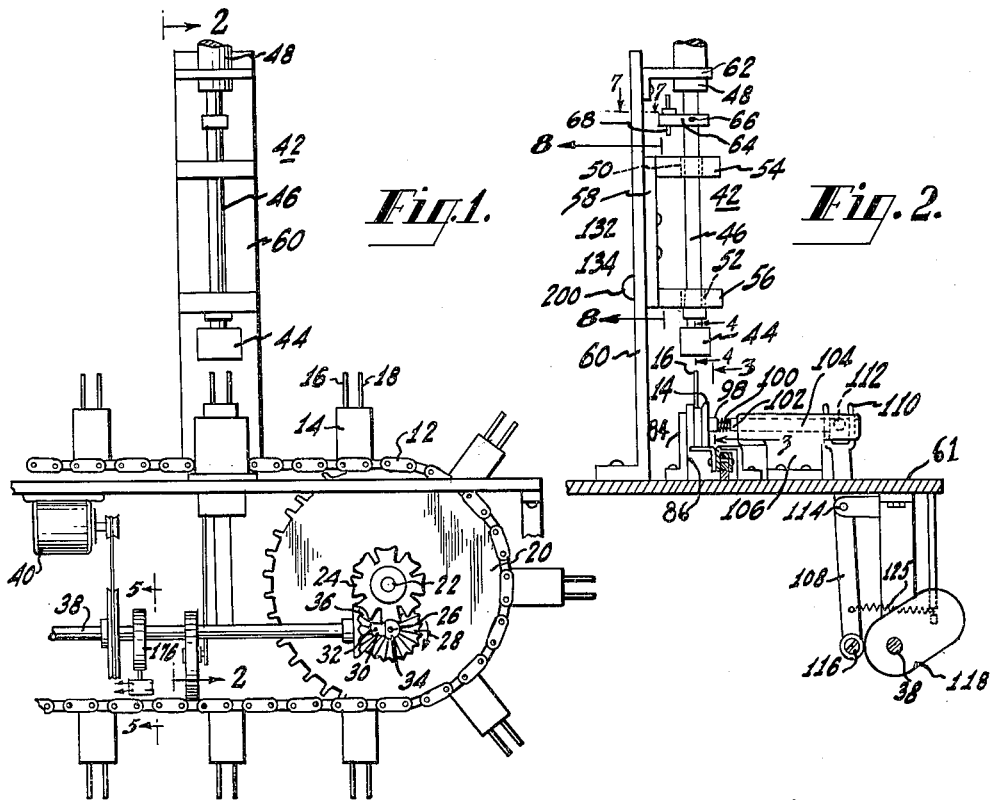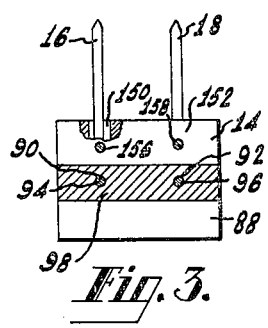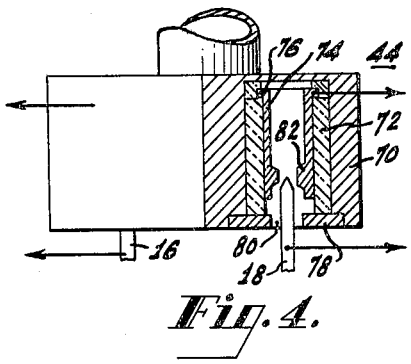

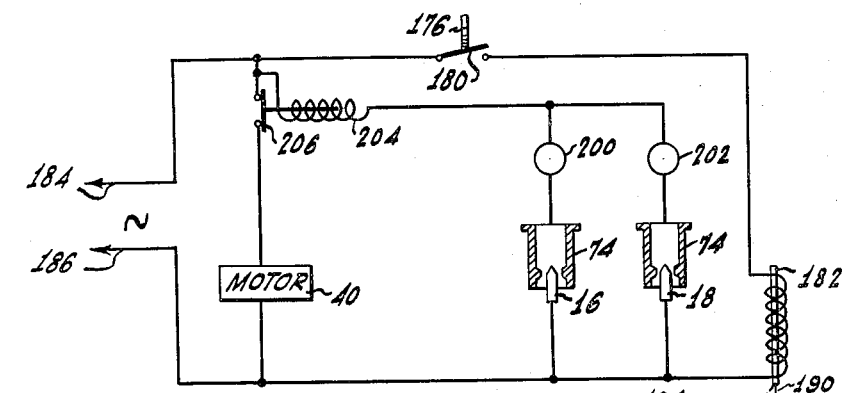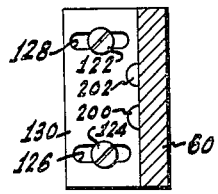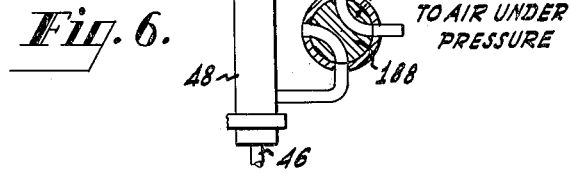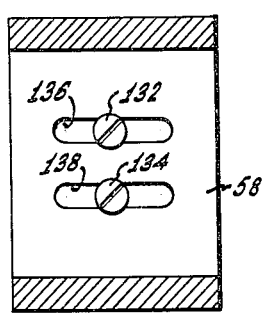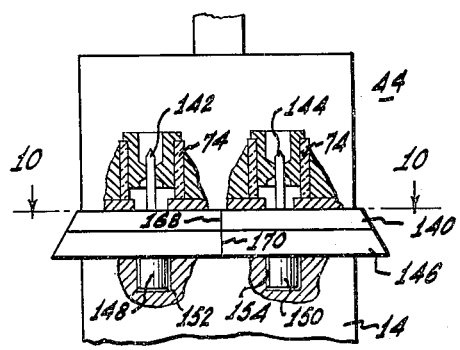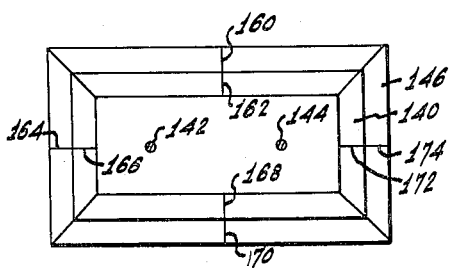

3,006,059
HIGH EFFICIENCY AUTOMATIC ASSEMBLING APPARATUS
Heinrich Hermanny, Westfield, N.J., assignor to Radio Corporation of America, a corporation of Delaware
Filed June 26, 1958, Ser. No. 744,799
4 Claims. (Cl. 29—25.19)

This invention relates to automatic assembling apparatus, and particularly to an assembling apparatus having means for automatically inspecting or testing for straightness a mandrel used in such apparatus, for increased efficiency of the apparatus.

One type of automatic assembling apparatus in which mandrels are used, particularly of the rectilinear kind, is employed in the manufacture of electron tubes.

For example, in an apparatus for assembling automatically, tube parts to form an electrode cage, rectilinear mandrels are utilized for receiving cathode sleeves in telescoped relation therewith.

One type of such apparatus is shown in copending application Serial No. 218,838, filed April 2, 1951, now Patent No. 2,842,832, issued July 15, 1958, and assigned to the same assignee as the present application.

In such apparatus it is mandatory that the mandrels used therein be perfectly straight. Several reasons support this requirement. A relatively slight distortion may permit a cathode sleeve to be telescoped thereover. But the position of the sleeve determined by the distorted mandrel may be displaced from a predetermined position desired for properly spacing the sleeve from an adjacent electrode, such as a grid or anode. The displacement referred to may be too slight to be detected visually. Thus the first indication of an improper mounting of a cathode sleeve may be provided only after the manufacture of a tube has been completed and during the usual testing thereof. It is then too late to associate the defectively mounted sleeve with a particular mandrel. In the meanwhile, a relatively large number of tubes may have been made with similar defects, thereby giving rise to intolerable shrinkage. Furthermore, if a mandrel is so distorted as to permit a telescoping thereover of a portion only of a cathode sleeve, continued operation of the machine may result in jamming that might involve serious damage to the machine.

Accordingly, it is an object of the invention to provide a device for detecting distortions in a rectilinear mandrel, even of relatively minor character, and for providing an indication which identifies a distorted mandrel.

A further object is to provide an improved automatic assembling apparatus utilizing one or more rectilinear mandrels for build-up thereon of parts, and including a device for inspecting each mandrel in advance of loading operations for assurance that the mandrels are free from distortion.

An embodiment of the invention, selected for illustrative purposes only, comprises an inspection device adapted to inspect two mandrels simultaneously. In assembling parts to form an electrode cage having two electrode assemblies in side by side relation a jig having two spaced mandrels is used. Each of the mandrels is adapted to receive a cathode sleeve.

In associating the inspection device of the invention with an automatic assembling apparatus of the type shown in the aforementioned copending application, it is preferable to position the device in advance of the first loading station of the apparatus to assure that the mandrels are free from distortion prior to mounting the first part, such as mica spacer plate, on the jig.

The inspection device includes a pair of metal sleeves insulatingly supported and spaced from each other a distance equal to the spacing between the mandrels aforementioned. The device is adjustable to dispose the metal sleeves referred to in accurate coaxial relation with respect to the two mandrels when the jig carrying the mandrels is locked in a stationary position during operation of the assembling apparatus. During such position of the jig, a support for the two metal sleeves is movable to cause end portions of the sleeves to receive end portions of the mandrels in telescoped relation. The sleeves have an inner diameter slightly larger than the diameter of the mandrels. As a consequence, a perfectly straight mandrel will be free from contact with its associated sleeve. However, a slightly bent mandrel will contact a sleeve.

The sleeves are included in a circuit in series relation to indicating lamps and a relay. The relay is disposed across a power line for energizing a motor driving the assembling apparatus referred to. Accordingly, if one or both of the mandrels under inspection should be distorted so as to contact a sleeve aforementioned of the inspection device, one or both of the lamps will light up to identify the faulty mandrel. At the same time the apparatus will be stopped, so that the defect may be corrected before a part is mounted on the mandrel.

Also associated with the device is advantageous set-up equipment which facilitates a setting up of the inspection device in coaxial and tilt-free relation to mandrels to be inspected.

Further features and advantages of the invention will become apparent from the following and more detailed consideration of an embodiment thereof.

Such more detailed consideration will be facilitated by referring to the accompanying drawing in which FIG. 1 shows a side elevation of a mandrel inspection device according to the invention and a portion of an automatic electrode cage assemblying apparatus with which the device coacts;

FIG. 2 is a view partly in cross-section and taken along the lines 2—2 of FIG. 1 and shows associated elements of the inspection device and assembling apparatus in more detail;

FIG. 3 is a view partly in cross-section and taken along the lines 3—3 of FIG. 2 and depicts a jig having two mandrels to be inspected;

FIG. 4 is a view partly in cross-section, along the lines 4—4 of FIG. 2, and shows the head portion of the inspection device adapted to receive two mandrels simultaneously for inspection;

FIG. 5 shows partly in section along the lines 5—5 of FIG. 1, a cam and switch system mounted on the assembling apparatus for controlling the operation of the inspection device in predetermined sequence with respect to the assembling apparatus;

FIG. 6 is a schematic representation of the circuit system associated with the inspection device and the assembling apparatus;

FIG. 7 is a cross-sectional view taken along the lines 7—7 of FIG. 2, and shows an adjustable feature of the inspection device;

FIG. 8 is a view taken along the lines 8—8 of FIG. 2 and shows another adjustable feature of the device;

FIG. 9 is a view partly in section of a portion of the inspection device and a jig with set-up members therebetween for adjusting the device to a position for accurate mandrel inspection; and FIG. 10 is a view partly in section taken along the lines 10—10 of FIG. 9, and shows orienting means provided on the set-up members.

One of the uses of an inspection device according to the invention, is in connection with an automatic apparatus for assembling parts to form an electrode cage. As is known, an electrode cage may include one or more electrode assemblies supported between two insulating spacer plates. Where more than one electrode assembly is included in a cage, each assembly is usually provided with an individual sleeve type cathode.

Electron tubes having cages including two electrode assemblies, such as double triodes having two triode assemblies in side by side relation and including a separate cathode for such assembly, are in wide use. Apparatus for automatically assembling such cages includes jigs each having two rectilinear mandrels in spaced relation for receiving tubular cathodes in telescoped relation thereon. In the assembling apparatus referred to, the cathodes are loaded automatically and are caused to follow a predetermined path to a jig. Unless a mandrel on such jig for receiving the cathode is straight, an improper mounting of the cathode occurs.

An automatic cage assembling apparatus of the type referred to is shown in FIG. 1. It includes an endless chain type conveyor 12 having mounted thereon a plurality of jigs 14, each having two rectilinear mandrels 16, 18 extending therefrom. When the jigs are on the upper course of the conveyor 12, the mandrels extend upwardly.

The conveyor chain 12 is mounted on two sprocket wheels, one of which, 20, is shown. Sprocket wheel 20 is fixed to a shaft 22, to which also is fixed Geneva gear 24. Positioned below and parallel to shaft 22, is a shaft 26, to which are fixed a bevelled gear 28 and a plate 30 having a pin 32 and a cam 34. Beveled gear 28 meshes with a beveled gear 36 fixed to a shaft 38. Shaft 38 is driven constantly by a motor 40. It will be seen from this that shaft 26 is constantly rotated, causing the pin 32 and cam 34 to successively engage Geneva gear 24 for rotating it intermittently. This intermittent movement is imparted by sprocket wheel 20 to the conveyor chain 12. The direction of rotation of motor 40 is such as to cause the upper course of the conveyor to move to the left as viewed in FIG. 1.

Spaced along the upper course of the conveyor 12 are a plurality of loading mechanisms, not shown, for loading on jigs 14, parts to form an electrode cage having two electrode assemblies in side by side relation. In advance of the first loading mechanism, not shown, and therefore in position to act on an empty jig, is a mandrel inspection device 42.

The mandrel inspection device 42, as shown more clearly in FIGS. 2 and 4 includes an inspection head 44 mounted on the lower end of a piston 46 adapted to be retracted into and extended from a pneumatic cylinder 48. The piston 46 snugly engages bearings 50, 52 in arms 54, 56 fixed to a plate 58, for sliding movement therein. The plate 58 is fixed to a relatively rugged standard 60 mounted on a table 61. Cylinder 48 is also fixed to plate 58 by means of a bracket 62. For limiting the magnitude of extension of piston 46 from cylinder 62, a collar 64, fixed to the piston by a screw 66, includes an adjustable stop 68 adapted to abut against the upper surface of arm 54.

The inspection head 44, as shown in FIG. 4, includes a metal housing 70 having two parallel recesses within each of which are disposed an insulating sleeve 72 snugly engaging the inner walls of a recess, and an electrically conducting metal sleeve 74 snugly engaging the inner walls of the sleeve 72. The sleeve 72 adjacent to its upper end is provided with an annular groove within which is received flange 76 extending radially from the upper end of the sleeve 74 for restraining relative movement of the two sleeves. In this way, sleeve 74 is electrically insulated from housing 70. The lower end of each recess is partly closed by means of a plate 78 suitably fixed to said lower end. The plate has an opening 80 in axial register with the metal sleeve 74.

The metal sleeve 74 has a restricted portion adjacent to its lower end as viewed in FIG. 4, defined by an annular inwardly extending embossment 82. The embossment 82 defines a cylindrical space having a transverse area to provide a relatively small spacing between the aforementioned embossment and the portion of mandrel 18 extendable into the cylindrical space referred to, during operation of the device. This spacing may be about 5 mils.

The opening 80 is preferably larger than the area defined by embossment 82. This will prevent abutment of a bent mandrel against the plate 78, which might damage the device and jig to a greater degree than that involved in a bent mandrel. The opening 80 is therefore sufficiently large to receive a mandrel that has an appreciable bend therein. Such receipt of the mandrel will cause it to attempt to enter the space defined by embossment 82. If the mandrel 18 is even slightly bent, as though an arc having a length of about 5 mils, physical contact will result between the embossment 82 and the mandrel 18, as will appear more clearly in the following.

While only one recess is shown in FIG. 4, it should be noted that a similar recess is provided in the non-sectioned portion of head 44, shown to the left in this figure, and a plate, insulating sleeve, and conducting metallic sleeve, similar to plate 78, and sleeves 72 and 74 are disposed in such similar recess for coaction with mandrel 16.

In order that such coaction between the inspection head 44 and the mandrels 16, 18 take place, it is necessary that the mandrels be positioned in accurate register with the conducting metal sleeves 74 in the inspection head. This requires the establishment of a reference location for either the head 44 or the mandrels 16, 18.

Such reference location is conveniently provided by the automatic assembling apparatus aforementioned in connection with the mandrels 16, 18. The intermittent mechanism comprising Geneva 24, pin 32 and cam 34, intermittently moves conveyor 12 and the jigs 14 thereon. Between intermittent movements thereof, the jigs 14 are successively in a predetermined position (FIG. 1). In this position, which is selected as a position in advance of the first loading position, means are provided for locating and locking a jig 14 accurately in a predetermined orientation with table 61 aforementioned.

This means as shown in FIG. 2, comprises a plate 84 fixed to table 61 and extending perpendicularly therefrom. The position of plate 84 on table 61 is accurately determined, so that a side 86 thereof lies in a plane constituting a lateral boundary of jig 14 when the jig is in accurately located position. Side 88 of jig 14 has two spaced openings 90, 92 (FIG. 3) adapted to receive two pins 94, 96 having tapered free ends (not shown) for first orienting the jig 14 in planes normal to the plane of side 86, and then locking the jig in oriented position. At the same time, a plate 98 (FIG. 2) is caused to bear against side 88 of the jig through the force of a spring 100, thereby moving the jig into abutment with side 86 of locating plate 84. For providing movement to pins 94, 96, a structure is provided (FIG. 2) including a slide 102 to which the pins 94, 96 are fixed and which is movable in a passageway 104 in a support 106. Movement is imparted to slide 102 by a lever 108 having a forked end 110 engaging a pin 112 fixed to the slide. Lever 108 is fulcrumed at 114 and has a cam follower 116 at its other end engaging a cam 118 mounted on shaft 38 aforementioned. When the cam follower 116 engages a lower dwell of cam 118, lever 108 is caused to rotate in a counter-clockwise direction, as viewed in FIG. 2, in response to the tension of a spring 120. Such rotation causes the pins 94, 96 to enter the openings 90, 92 in the jig and impels the plate 98 against side 88 of the jig for orienting the jig and locking it in desired position. Cam 118 is angularly oriented in such a way as to present its lower dwell to cam follower 116, only during intervals between intermittent movements of the conveyor 12. During such movements, the upper dwell on the cam engages the cam follower causing the lever 108 to rotate in a clockwise direction (FIG. 2) to disengage the pins 94, 96 and the plate 98 from jig 14.

It will be appreciated from the foregoing that when the jig 14 is oriented and locked against movement, as shown in FIG. 2, the mandrels 16, 18 thereof are in a predetermined axial position. This position is used as a reference to determine the position of the inspection head 44 for disposing the metal sleeves 24 therein, in axial register with the mandrels 16, 18 in the aforementioned position. It should be noted in this connection that the two metal sleeves 24 in the inspection head 44 are spaced similarly to mandrels 16, 18, so that movement of head 44 as a whole only, is involved in securing the register referred to.

Such movement of the inspection head 44 is permitted by the manner in which standard 60 is fixed to table 61, and the way the plate 58 is fixed to the standard 60. As shown in FIG. 7, standard 60 is fixed to table 61 by means of two screws 122, 124 extending through slots 126, 128 in flange 130 of the standard, and having heads bearing against the exposed surface of the flange. By releasing the screws 122, 124, the standard 60 is movable to the right or left as viewed in FIG. 2. The plate 58 is fixed to standard 60 by means of two screws 132, 134 having heads bearing against the free face of the plate and extending through slots 136, 138 through the plate. A release of screws 132, 134 will permit the plate 58, and the assembly mounted thereon comprising cylinder 48, piston 46 and inspection head 44, to be moved into and out of the paper as viewed in FIG. 2. The two movements of the standard 60 and the plate 58, permits movement of the head 44 in any direction in a plane normal to the plane of mandrels 16, 18, for providing a desired axial register between the mandrels and the metal sleeves 24 in the inspection head. After such register is obtained, the screws aforementioned are tightened to fix the head in the aforementioned register.

For facilitating the accomplishment of the register referred to, set-up members, shown in FIG. 9, may be employed. One set-up member comprises a plate 140 having mandrels 142, 144 adapted to fit snugly into metal sleeves 74 in the inspection head 44 so as to be retained by the head. The other set-up member comprises a plate 146 having pins 148, 150 adapted to extend snugly into wells 152, 154 in jig 14 (FIGS. 3 and 9). The mandrels 16, 18 which previously extended into the wells aforementioned were removed by loosening set screws 156, 158 (FIG. 3). A retightening of the set screws serves to fix the pins 148, 150 to the jig. The edges of plates 140, 156 are bevelled, as shown in FIG. 9, so that the matching of reference notches or lines 160 to 174 thereon (FIG. 10) may be facilitated. When the reference lines are matched as shown in FIG. 10, by suitably adjusting the positions of standard 60 and plate 58, as aforementioned, and the plates 140, 146 are in parallel relation, the inspection head is accurately oriented axially with respect to the mandrels 16, 18 when replaced in the wells 152, 154 of jig 14.

While the adjustable stop 68 (FIG. 2) is normally fixed to allow a downward movement of the head 44 to the position shown in FIG. 4, wherein relatively short end portions of mandrels 16, 18 extend into the metal sleeves 74, it may be released by loosening screw 66, to permit the head 44 to move downwardly a greater distance and to the position shown in FIG. 9 in relation to the jig 14. After the set-up operation is completed, the stop 68 is adjusted to the position shown in FIG. 2 wherein it stops a downward movement of head 44 beyond the position thereof shown in FIG. 4 in relation to mandrels 16, 18, thereby permitting a normal downward thrust of the head.

Such normal downward movement or thrust of the inspection head 44 is correlated in time to the movements of the conveyor 12 and the slide 102 of the jig locating mechanism aforementioned. As shown in FIGS. 1, 2, 5 and 6, a cam 176 fixed to shaft 38 is angularly oriented in relation to cam 34 of the Geneva transmission referred to before herein, so that the raised dwell of cam 176 engages a normally open switch 180 only during a portion of the period when the raised dwell on cam 34 engages Geneva gear 24 for restraining its movement. As shown in FIG. 6, when switch 180 is closed, a solenoid 182 is energized by a source of alternating electrical power not shown, to which leads 184, 186 may be connected. For convenience, lead 186 is connected to ground. Energization of solenoid 182 causes a counterclockwise rotation of valve 188 through links 190, 192, thus causing the upper end of cylinder 48 to communicate with a source of air under pressure through a duct 194. This results in a lowering of head 44 for an inspection engagement with mandrels 16, 18.

Shortly prior to this time and when cam 38 (FIG.1) restrains rotation of Geneva gear 24 and movement of conveyor 12, cam 118 (FIG. 2) presents a lower dwell to cam follower 116, to cause the slide 102 to move the jig locating and locking positions.

Further rotation of shaft 38 in a counterclockwise direction, as shown in FIG. 2, causes the cam 34 (FIG. 1) to rotate clockwise and out of engagement with the Geneva gear 24, the pin 32 thereafter engaging the Geneva gear for providing a rotational movement thereof through a relatively small arc. Before such movement occurs, cam 176 (FIGS. 1 and 5) will present its lower dwell to switch 180, which will cause the same to remain open. When switch 180 is open, the solenoid 182 is deenergized and the valve 188 is rotated clockwise (FIG. 6) in response to the force of a tension spring 196 connected to a fixed support 198. This causes the lower end of cylinder 48 to communicate with the air pressure source resulting in elevation of piston 46 and disengagement between the inspection head 44 and the mandrels 16, 18. Also, cam 118 (FIG.2) will have rotated counterclockwise so that its raised dwell engages cam follower 116 and keeps the slide 102 in its terminal position to the right as viewed in FIG. 2, thereby releasing plate 98 and pins 94, 96 from engagement with jig 14. The inspection head 44 and the locating and locking slide 102 are now in positions to permit the conveyor 12 to undergo an intermittent movement.

The inspection device and the assembling apparatus proceed through the cycle referred to, each time that a mandrel under inspection is straight. However, when a bent or distorted mandrel is presented for inspection, a modification in the aforementioned cycle occurs. As shown in FIG. 6, when a mandrel (16 or 18) is bent through an arc of about 5 mils or more, it will contact a sleeve 74. Since cam 176 keeps switch 180 closed during an inspection operation, as explained in the foregoing contact between one or both of mandrels 16, 18 with sleeves 74 will close a circuit including one or both of indicating lamps 200, 202 and a relay 204. As a consequence, one or both of the lamps 200, 202 will light up to identify the particular mandrel that is distorted and at the same time the relay 204 will open a switch 206 across a circuit including motor 40. This will cause the motor 40 to stop with a consequent stoppage of conveyor 12. However, the lamp 200 and 202 are included in a circuit parallel to the circuit engaging motor 40, so that when one or both of mandrels 16, 18 are bent, one or both of the lamps 200, 202 will continue to provide an indication of the location of the bent mandrel to facilitate replacement thereof.

It will be noted from FIGS. 2 and 5, that cam 118 is so oriented in relation to cam 176 on shaft 38, that the lower dwell of cam 118 will engage cam follower 116, before the raised dwell on cam 176 closes switch 180. This causes the slide 102 to be moved to locating and locking position with respect to jig 14, before the solenoid 182 (FIG. 6) is energized for lowering the inspection head 44. Thus the head 44 is lowered only after mandrels 16, 18, if straight, have been located accurately in axial register with the sleeves 74 in the inspection head. However, if one or both of the mandrels are bent, such axial register is intentionally avoided to allow a misregister to be detected by the inspection device, as aforementioned.

What is claimed is:

1. An automatic assembling apparatus comprising a support, an electrically conductive mandrel having a predetermined diameter fixed at one end thereof to said support, means for moving said support to a predetermined position, inspection means adjacent to said mandrel in said position, said inspection means including an electrically conductive sleeve having a larger inner diameter than said predetermined diameter, whereby said mandrel if bent to a predetermined magnitude is adapted to contact said sleeve, means for telescoping said sleeve over the other end of said mandrel, said other end of said mandrel being tapered, whereby end abutment of said mandrel with respect to said sleeve is prevented, and an indicating means electrically connected to said sleeve for providing an indication, only when said mandrel is bent to at least said predetermined magnitude.

2. An automatic assembling apparatus comprising a jig, a mandrel having one end fixed to and extending from said jig, means for moving said jig to a predetermined position, means adjacent to said jig in said position for orienting a portion of said mandrel adjacent to said jig along a predetermined axis, a mandrel inspection device having a sleeve, means for moving said sleeve in coaxial relation to said fixed end and into telescoped relation with an end portion of said mandrel remote from said jig, said end portion having a diameter smaller than the inner diameter of said sleeve and terminating in a taper, said diameters differing by a predetermined magnitude, whereby said end portion of said mandrel contacts said sleeve laterally only, if said end portion is bent through an arc greater than one-half of said predetermined magnitude, and means connected to said sleeve and responsive in a signal when said end portion contacts said sleeve.

3. An inspection device comprising a support having a cavity, an insulating sleeve fixed to the walls of said cavity, an electrically conductive sleeve mounted within said insulating sleeve and insulated from said support, an indicating means, said conducting sleeve and said indicating means being electrically connected in series to an electrical potential differing from ground, said conducting sleeve having a tapered inner annular embossment, whereby said sleeve is adapted to receive free from end butt relation, a distorted mandrel at ground potential in contact relation with the inner wall thereof, whereby said indicating means is energized for identifying said distorted mandrel.

4. A mandrel inspection system comprising a jig having a planar surface, an inspection device movable in a predetermined rectilinear path, means connected to said jig for moving said jig into approximate register with said path, means movable when said jig is in said approximate register for engaging said jig and rotating the same to dispose said planar surface in normal relation to said path and to position a predetermined portion of said planar surface in register with said path, said inspection device including a sleeve movable with said device in concentric relation to said path and to a position spaced a predetermined distance from said planar surface, a tapered mandrel fixed to and extending from said predetermined portion a distance greater than said predetermined distance and having a diameter less than the internal diameter of said sleeve, whereby said mandrel is adapted to enter said sleeve in lateral contact relation therewith only, if said mandrel is bent out of normal relation to said surface to a degree greater than one-half of the difference between the diameter of said mandrel and the internal diameter of said sleeve, and means connected to said sleeve for producing a signal in response to contact between said sleeve and mandrel.

References Cited in the file of this patent

UNITED STATES PATENTS

| 2,554,982 | Hartley et al. | May 29, 1951 |
| 2,760,254 | Wolke et al. | Aug. 28, 1956 |

FOREIGN PATENTS

| 755,393 | Great Britain | Aug. 22, 1956 |